United States Patent [19]

Wisner

[11] 4,381,494
[45] Apr. 26, 1983

[54] INTERCHARACTER GAP DETECTOR FOR MICRS

[75] Inventor: Daniel A. Wisner, Milan, Mich.

[73] Assignee: Burroughs Corporation, Detroit, Mich.

[21] Appl. No.: 194,045

[22] Filed: Oct. 6, 1980

[51] Int. Cl.³ .............................................. G06K 9/20
[52] U.S. Cl. ...................................... 382/64; 235/449
[58] Field of Search ............. 340/146.3 C, 146.3 AG, 340/146.3 SG, 146.3 Y; 235/449, 450, 474, 92 T, 92 LG, 92 PB; 360/25, 32, 57, 137, 50

[56] References Cited

U.S. PATENT DOCUMENTS

| | | | |
|---|---|---|---|
| 3,167,742 | 1/1965 | Miller | 340/146.3 C |
| 3,278,900 | 10/1966 | Wood | 340/146.3 C |
| 3,302,174 | 1/1967 | Djinis et al. | 340/146.3 C |
| 3,629,826 | 12/1971 | Cutaia et al. | 340/146.3 SG |
| 3,638,238 | 1/1972 | Milford et al. | 340/146.3 C |
| 3,662,341 | 5/1972 | Baumgartner et al. | 340/146.3 SG |

*Primary Examiner*—Leo H. Boudreau
*Attorney, Agent, or Firm*—Delbert P. Warner; Kevin R. Peterson

[57] ABSTRACT

System for determining whether magnetic ink is present on specific areas of a document bearing magnetic ink characters. Signals are produced as a magnetic read head passes over the area in question on the face of the document. These signals are routed to apparatus which operates in response to the signals by providing outputs of a first kind when magnetic ink is present and outputs of another kind when ink is not present or is not present in sufficient amount to produce a signal exceeding a threshold value. Logic means responsive to the signals of the first and second kinds establish the presence or absence of magnetic material.

9 Claims, 9 Drawing Figures

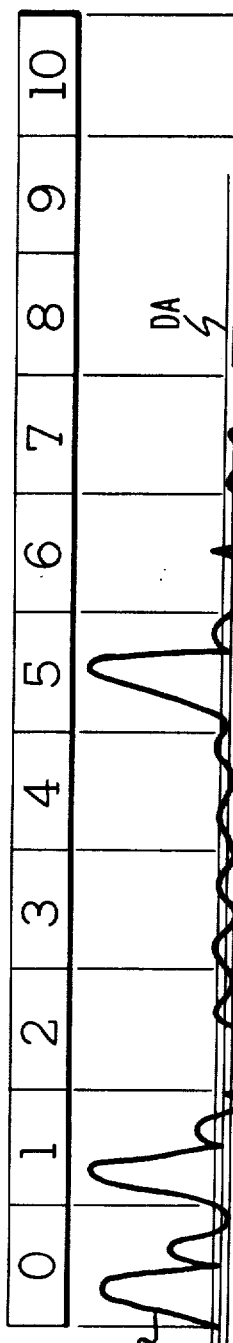
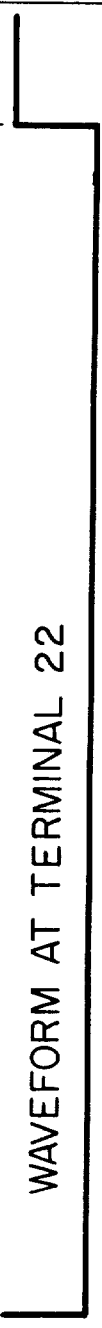
FIG.7. WAVEFORM AT TERMINAL 15
FIG.8. WAVEFORM AT TERMINAL 17
FIG.9. WAVEFORM AT TERMINAL 22

INTERCHARACTER GAP DETECTOR FOR MICRS

BACKGROUND OF THE INVENTION

1. Field of the Invention

The present invention relates to apparatus of use with magnetic ink character recognition systems for determining whether character defining magnetic material is present or absent in a particular space of interest. The invention relates specifically to means for distinguishing between intercharacter gaps and certain portions of magnetic characters.

2. Description of the Prior Art

Among the prior art characters employed in magnetic ink character reading systems are the MICR E13B characters formed as a 7×9 matrix which, in a standard format, are made up of squares of a standard size which are referred to hereinafter as feature periods.

It is impossible to assure absolutely uniform distribution of magnetic ink on paper documents such as bank checks. Every irregularity in the fibre of the paper results in variations in the amount of ink registered on the paper. In addition, variations in the amount of ink applied by the printing press adds to this lack of uniformity. As a consequence, the output signals from a read head as it passes over areas bearing magnetic ink include many irregularities caused by changes in magnetic ink density, voids in the ink, irregular edges on the characters and the like. In the past, attempts to compensate for these irregularities have led to the use of imposed a.c. fields and filters, as indicated below.

The signal, or waveform, generated as a character formed of magnetic material on the face of a document is moved past a read head is proportional to the first derivative of the flux distribution associated with the magnetic material. For reasons given above, this signal includes many irregularities. A common practice in the past has been to clean up this signal, or waveform, by passing it through a low pass filter. The low pass filter strips off the noise components generated by variations in the character edges, the fringing at the head gap, voids in the magnetic ink, variations in the magnetic ink density and the like.

An unfortunate consequence of filtering signals in the manner described is a loss of information, making it more difficult to distinguish between the intercharacter gaps and certain portions, or feature periods, of magnetic characters. The feature periods which are most difficult to distinguish from intercharacter gaps are periods from which the read head generates relatively low signals due to the fact that the amount of magnetic material sensed remains relatively constant throughout the period. Examples of such feature periods are found wherever part of a character is formed of magnetic material located only in horizontal patterns between parallel horizontal edges as opposed to areas where magnetic material is found in vertical patterns which cause wide variations in signals produced by the read head as it passes.

A prior art means used to distinguish between the intercharacter gaps and the magnetic characters present has been to magnetize the magnetic material of the characters with an a.c. field. The read head then senses both the a.c. field and the d.c. field, thus better enabling the system to detect the presence of material forming parts of characters which produce low amplitude signals as distinct from the absence of material indicating intercharacter spaces. An objection to this prior art procedure is that an additional write head to inject the a.c. field and an a.c. oscillator to drive the additional head are required.

The present invention avoids the disadvantages of the prior art by making use of irregularities in the signal derived from the read head as it passes over the printed characters. In this regard, it has been discovered that the irregularities in the signal as the head passes over individual magnetic characters, which in many respects correspond to an a.c. bias, may be used to establish the presence of magnetic material forming a character when contrasted to the general absence of irregularities in the signal as the read head passes over an intercharacter gap. This distinction is particularly important in the prevention of an erroneous indication of an intercharacter gap in certain portions of characters having horizontal areas which incorporate a relatively constant amount of magnetic material. An example is the character zero which includes horizontal spaces, or feature periods, in which the only variations in signal strength produced by the read head are the consequence of accidental variations in the amount of magnetic material deposited between edges forming the tops and bottoms, or upper and lower boundaries, of horizontal portions of the zero.

SUMMARY OF THE INVENTION

The present invention is directed to the overall problem of reading magnetic characters and more particularly, as a part of that problem, it is directed to the determination of whether magnetic material, usually magnetic ink, is present in successive areas representing feature periods on the face of a document.

In order to determine whether magnetic material is present, the invention employs raw signals from a read head, which are produced as the read head is passed over a document bearing magnetic characters. During periods when no signals, or substantially no signals, are produced it is clear that the read head is passing over an area, such as an intercharacter gap, in which little or no magnetic material is present. When signals above certain values are produced, it is clear that the head is passing over magnetic material which may form part of a magnetic character. Signals produced as the read head passes over parts of a magnetic character where ink distribution is uniform, except for accidental variations such as were previously pointed out, will have a lower value than the readily identified signals and frequently have been hard to distinguish in the past from signals produced as the read head passes over intercharacter spaces. Making this distinction between intercharacter spaces and parts of characters having fairly uniform distribution of ink becomes particularly difficult for documents which previously have been sorted several times, since a little bit of the magnetic ink is smeared across the document each time there is a mechanical sort.

In the case referred to above in which substantially no signals are produced by the read head, a threshold detector coupled through an amplifier from the read head is used to provide a logic ONE. This signal is used in the control of a counter which in the absence of a ZERO input to the counter causes it to reset, counts clock pulses to provide a terminal count of logic ONE after two feature periods elapse, i.e. when time to scan two features has elapsed. The logic ONE from the counter indicates the read head has been scanning an intercharacter gap.

When signals are produced by the read head, the threshold detector will provide a series of logic ZERO's. These logic ZERO's are used to reset the counter and prevent a cumulative count. In the absence of a cumulative count from the counter, the counter output will have a ZERO, or NULL, value which means that magnetic material is present under the read head.

BRIEF DESCRIPTION OF THE DRAWINGS

FIG. 7 is a representation of an actual waveform derived from reading the "8" in FIG. 5.

FIG. 8 is a waveform produced when the waveform of FIG. 7 is processed by the threshold detector of FIG. 1.

FIG. 9 shows the output of the counter of FIG. 1 as the read head progresses past a document bearing the character "8."

DESCRIPTION OF A PREFERRED EMBODIMENT

Figure 1:
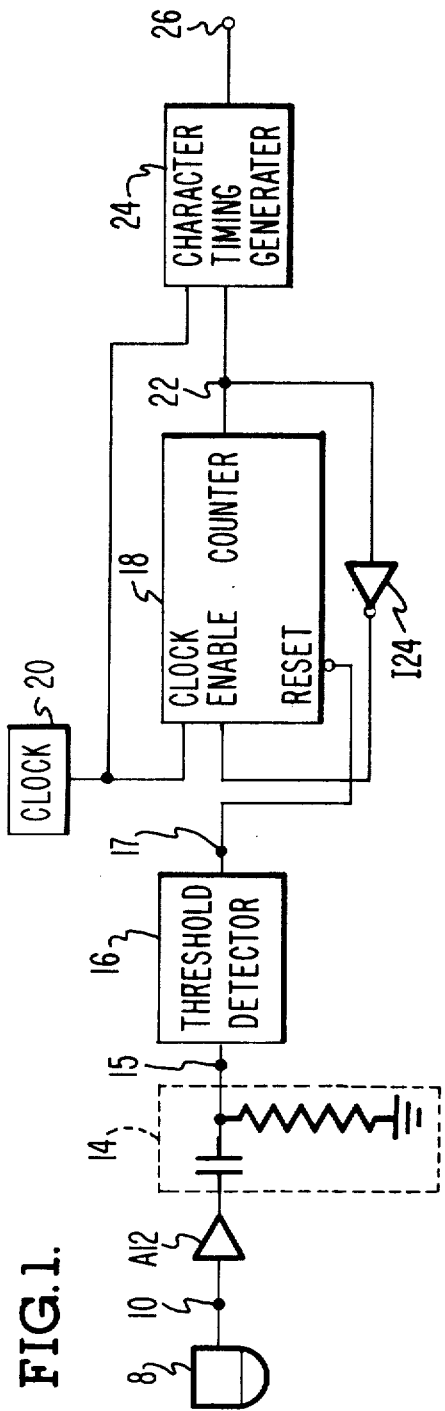
FIG. 1 is a block diagram of a circuit employed in the practice of the invention.

Turning to the block diagram in FIG. 1, signals from a magnetic read head 8 are provided at 10 and through a buffer amplifier A12, which may be an SN72741, to a suitable differentiator circuit at 14. A threshold detector at 16, which may be composed of a pair of LM311s (see FIG. 2), functions as a hard limiter in response to the output of 14 to provide a logic signal in the form of a ONE or a ZERO. This logic signal is applied to the reset terminal of a counter 18, which in a preferred example may be an SN74161.

The threshold detector 16 is organized in such a way that it provides a low, or logic ZERO, at terminal 17 when signals from the read head indicate that the read head is passing over an area bearing magnetic material. In response to logic ZERO, the counter 18 will be reset to start counting pulses from the reference clock source 20. The counter will continue to be reset to start counting everytime logic ZERO is received which will happen periodically for so long as magnetic material is sensed by the read head. Counter 18 may be an SN74LS161 from Texas Instruments or be of some other conventional design.

After the counter has been reset to count by a logic ZERO, a logic ONE to the reset terminal of the counter from terminal 17, indicating that no magnetic material is present under the read head, will enable the counter to continue to count and provide a terminal count after a time exceeding two feature periods elapses, providing a logic ZERO is not received at 17 during this time period. This terminal count is a logic ONE which is applied at terminal 22 and via an inverter I24, which may comprise an SN7404, as a logic ZERO to the enable terminal of the counter 18. The counter is thereby stopped from counting further until the presence of extraneous noise from the read head produces a logic ZERO via the threshold detector 16 to reset the counter.

The logic ONE at terminal 22 is available, via the inverter I24, to control the counter, as indicated above. The logic ZERO or NULL is available as an input at 22 for use in adjusting the phase of a character timing generator at 24 which, in a preferred example, employs a phase locked loop to control the timing of the character reader over a terminal 26 or the like.

A high, or logic ONE, from the threshold detector 16 at terminal 17 indicates that extraneous signals are absent from the read head and therefore that the read head is passing over an area bearing little or no magnetic ink. Since the reset terminal of the counter is responsive to ZERO and not to ONE, if no ZERO is applied to start the count before the ONE Is applied, the counter will be inhibited from counting until a ZERO is received indicating the presence of magnetic material.

Figure 2:
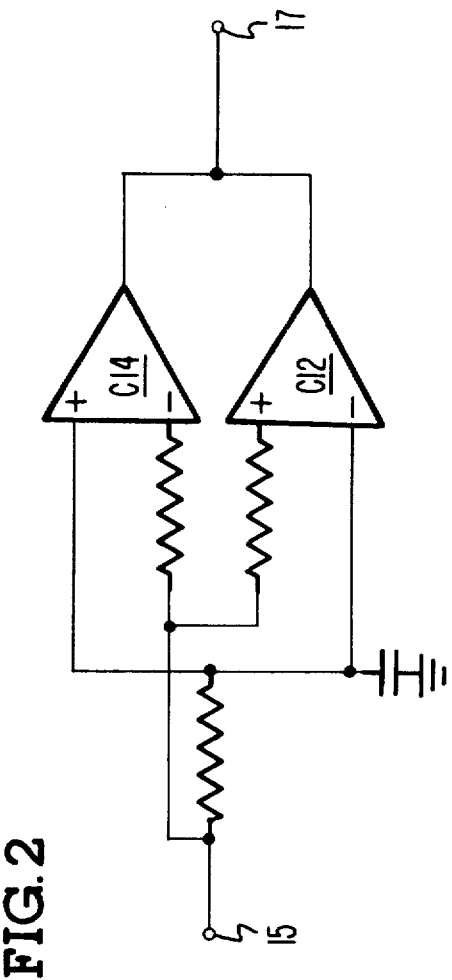
FIG. 2 is a block diagram showing further details of circuits employed with the threshold detector of FIG. 1.

FIG. 2 shows further details of the threshold detector 16 in which a pair of differential comparators C12 and C14 are coupled in parallel between terminals 15 and 17. The comparators may preferably be National Semiconductor LM 311's or their equivalent.

As coupled in FIG. 2, the noninverting input of comparator C12 must go more negative than the inverting terminal in order to provide a ground, or logic ZERO, output. Similarly, the inverting input of comparator C14 must go more positive than the noninverting terminal to provide a ground output.

Considering the relationships set forth in the preceding paragraph, it will be seen that a change in potential from the read head 8, via the buffer amplifier A12 and the differentiator 14 may produce a sufficient change over terminal 15 to the respective noninverting input of C12 or the inverting input of C14 to produce a ground at terminal 17. Such a ground or logic ZERO, indicating that magnetic material is present, will cause the counter 18 to reset and start counting clock pulses. The counter will repeatedly reset each time a logic ZERO is received. After receipt of a logic ONE, the counter will continue to count, unless another ZERO is received, to provide a ONE output at terminal 22 when the count reaches a value corresponding to two feature periods. This ONE is applied to the inverter I24 which provides a ZERO input to the enable terminal of the counter, thereby turning the counter off. The counter then remains in the terminal count state until such time as the presence of magnetic material is indicated by a ZERO input to its reset terminal at which time it starts the count again.

Figure 3:
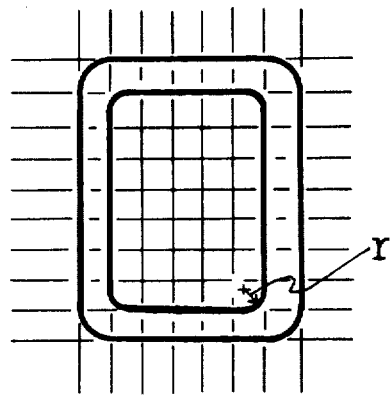
FIG. 3 is a diagram on an enlarged scale of an idealized ZERO, according to the MICR E13B standards showing an exemplary matrix upon which it is constructed.
Figure 4:
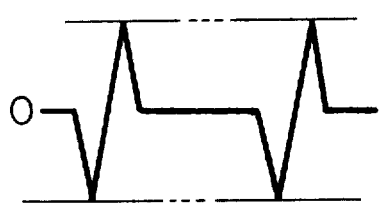
FIG. 4 represents idealized waveforms which could result from scanning the idealized magnetic ZERO of FIG. 3 with a read head.

FIG. 3 is a representation on an enlarged scale of an idealized ZERO according to the requirements for MICR E13B characters. The standard 7×9 matrix shown would consist of 0.013 inch squares if drawn to scale. FIG. 4 presents idealized waveforms indicating in a general way how the potential produced by a read head will vary as the character ZERO passes by the read head. The detection threshold of the read head is set so that the minimum noise required for detection will be that of a signal equivalent to the signal generated as the read head passes a single corner radius "r" (as indicated, for example, in FIG. 3) of 0.0065 inch. Along the zero level in FIG. 4, which represents a NULL, it will be seen that the NULL extends over more than three feature periods. Such a NULL, in the center of an eight feature period, can be used to identify the character as a zero.

It will be appreciated that the read-out shown in FIG. 4 could only occur with a perfectly printed character such as that represented in FIG. 3. Such an idealized character would have no character edge irregularities, no voids in the magnetic ink and no variance in the magnetic ink density. A more realistic representation of a MICR character is shown by the representation of a character "8" in FIG. 5. An idealized waveform of an "8" is shown in FIG. 6. A more realistic representation of the waveform generated by reading an actual character is shown in FIG. 7.

Figure 5:
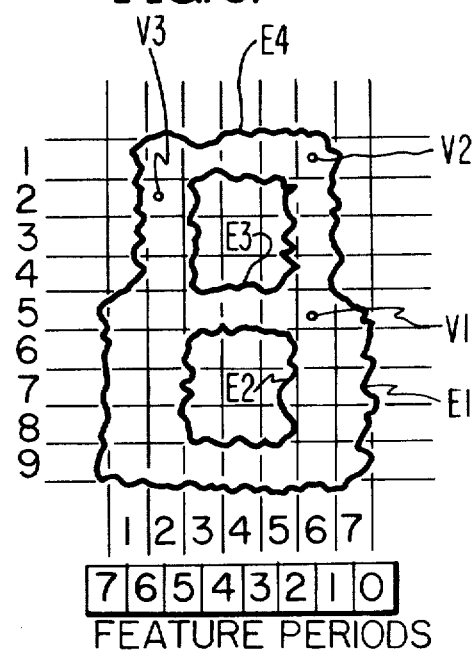
FIG. 5 is a representation on an enlarged scale of a character "8" formed by magnetic ink on a paper document.
Figure 6:
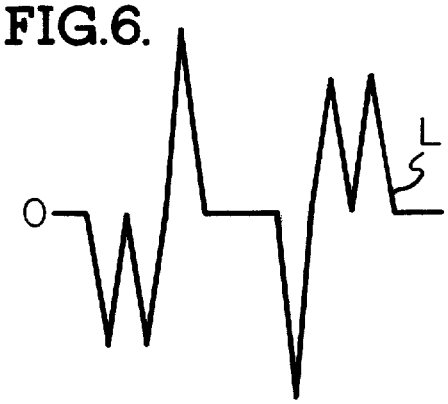
FIG. 6 is an idealized waveform representative of a signal derived from reading the "8" in FIG. 5.

FIG. 5 is a representation, on an enlarged scale, of a character "8" formed of magnetic ink as it might appear on a check or other document. It will be seen that the character has an uneven quality along its external edges, as indicated by E1, E4, and along its internal edges as indicated at E2 and E3. In addition to the erratic edges, the character exhibits unevenness in the distribution of magnetic ink over its surface. This unevenness varies from point-to-point in the surface depending upon the texture of the paper used in printing and the nature of the transfer of ink from the printing press used to print the documents. Some areas of the character will bear relatively thick continuous layers of ink, other areas will bear thinner layers of ink with small bare spots here and there, while still other areas may include large spots which are bare as indicated by exemplary circles at V1, V2 and V3.

It will be seen from FIG. 5, that the character is formed on a matrix of squares labeled horizontally 1–7 and vertically 1–9 to represent the standard matrix for the E13B characters. Eight feature periods 0–7 are numbered along the bottom of the character to correspond to distinguishable areas of the characters which are sensed as the head passes. The numbering of the feature periods is in ascending order from right to left to correspond to the relative motion between the read head and the document.

An idealized waveform, derived from reading FIG. 5, and corresponding to the waveform at terminal 15 of FIG. 1, is indicated in FIG. 6. It will be recognized that this waveform should be read from right to left to correspond to the passage of the document represented by "8" in FIG. 5 across the read head, since the read head starts to read on the right and progresses to the left edge. The leading edge L of the waveform will cause the threshold detector to provide a ZERO output which will reset the counter 18 to start a count. The count will continue until two feature periods have passed, providing a ZERO input is not repeated, at which time the counter will supply a ONE output which functions as a synchronization signal of use for synchronizing the operation of the character timing operator 24.

FIG. 7 represents a waveform at terminal 15 of FIG. 1 as it would appear when the character "8" of FIG. 5 is read by the read head 8. The rise of the leading edge L of the waveform causes a ZERO output from the threshold detector. This zero resets the counter which provides a synchronization signal to the character timing generator 24. The timing generator uses this information to provide for synchronization of the phase of the phase locked loop. The detection thresholds are indicated by lines DA and DB above and below line DO which represents the zero level. The detection thresholds are set so that the minimum noise required for detection will be that of a signal equivalent to the signal generated as the read head passes a single radius of 0.0065 inch.

The waveform in FIG. 7 has corresponding elements but includes details which make it quite different from the idealized waveform in FIG. 6. The differences reflect the many imperfections of the actual character "8" as opposed to the ideal. Among these differences are elements of noise which may be called edge noise and area noise. Edge noise is made up of noise caused by irregularities in the edges, such as those indicated by vertical edges E1, E2 and horizontal edges E3 and E4. Area noise is caused by irregularities in the magnetic material such as variations in thickness and actual bare spots such are indicated at V1, V2 and V3 in FIG. 5. Edge noise is roughly proportional to the number of edges passing beneath the head where the effect of variations in horizontal edges is more significant than variations in the vertical edges. Area noise is roughly proportional to the area passing beneath the read head.

The waveform of FIG. 8 is reproduced by the threshold detector at terminal 17 of FIG. 1 in the form of a plurality of pulses. These pulses result from excursions of the waveform of FIG. 7 across the detection threshold lines DA and DB on either side of the zero line DO.

The outputs of the threshold detector are applied to the reset terminal of the counter 18 causing it to reset to zero each time there is a pulse. As a consequence, the counter is reset over and over so that there is no accumulation of count pulses and the output of the counter at 22 remains a flat ZERO or NULL past feature period 7, as indicated in FIG. 9. Since the output of the threshold detector will rise to logic ONE as the read head passes over an intercharacter gap, the counter having started to count by the last logic ZERO will continue counting and count through feature periods labeled 8 and 9 in FIG. 7. At the end of feature period 9 the counter will provide a logic ONE output on terminal 22 as indicated by the rise of the waveform in FIG. 9 at the beginning of feature period 10. The logic ONE may be applied as a synchronization pulse from terminal 22 to the character generator 24.

It will be seen from the waveforms in FIGS. 7 and 8 that apparatus according to the present invention is able to distinguish an area of relatively constant magnetic content, such as that in feature periods 3 and 4, from an area between characters, having little or no magnetic content, such as that in feature periods 8 and 9. It will be appreciated also that small amounts of magnetic material distributed in the intercharacter spaces of feature periods 8 and 9, either by errors in printing or by accidental transfer of magnetic material as would occur during previous document routing, would not usually produce a waveform exceeding the threshold levels required to generate signals capable of resetting the counter. For this reason, among others, the present invention is capable of distinguishing intercharacter spaces from spaces within the characters which present low-level signals.

What is claimed is:

1. In a character recognition system, means for determining whether magnetic material is present in a particular concentration in an area of a document scanned by a magnetic character read head, comprising:

means responsive to raw signals from a magnetic character read head for providing output signals, said output signals including first signals which are generated by passage of the read head past magnetic material which is present in a particular concentration and second signals denoting passage of the read head past areas where magnetic material is present in less than the particular concentration;

said means responsive to raw signals including a threshold detector including two differential comparators coupled to produce said first signals and said second signals, where the first signals include extraneous noise and the second signals are substantially free of noise; and means coupled responsive to said first signals and said second signals to establish the presence or absence of magnetic material in the particular concentration for periods determined in accordance with said signals.

2. The invention as claimed in claim 1, in which:

the means coupled to establish the presence or absence of magnetic material in the particular concentration includes a counter;

said counter is reset by logic ZERO among said first and second signals, said counter responding to being reset by starting the count of clock pulses; and said counter providing a logic ONE output when a count of pulses representing two feature periods is reached.

3. In a character recognition system, means for determining whether magnetic material is present under a read head, comprising:

threshold detector means coupled responsive to signals from a magnetic character read head for providing logic signals of which first logic signals denote the presence of a strong concentration of magnetic material and second logic signals denote a weaker concentration of magnetic material; and means coupled responsive to said second logic signals to measure the duration of said signals and establish the presence of the weaker concentration of magnetic material.

4. The invention as claimed in claim 3, in which:

the detector means operates as a threshold detector including two differential comparators coupled to distinguish between said first logic signals and said second logic signals, where the first logic signals include extraneous noise and the second logic signals are substantially free of noise.

5. The invention as claimed in claim 3 or 4, in which:

the means coupled responsive to said second logic signals to measure the duration of said signals and establish the presence of the weaker concentration of magnetic material includes a counter;

said counter is reset by logic ZERO among said first and second signals, said counter responding to being reset by starting the count of clock pulses; and said counter providing a logic ONE output coupled to stop the counter when a count of pulses representing two feature periods is reached.

6. In a character recognition system, means for determining whether magnetic material is present in critical quantities in areas of a document being scanned by a magnetic character read head, comprising:

means responsive to raw signals from a magnetic character read head for providing output signals, said output signals including first signals of a kind denoting passage of the read head past areas of a document bearing critical quantities of magnetic material and second signals of a kind denoting passage of the read head past areas bearing less than critical quantities of magnetic material;

counter means coupled to distinguish between said first and second signals;

said counter means being responsive to selected ones of said first signals to reset to zero count and then prevent the accumulation of a count, said counter means being responsive to said second signals to continue a count, unless disturbed by a first signal, and to provide a logic ONE after a count of said second signals which is two feature periods long, where said count two feature periods long denotes an intercharacter space two feature periods wide containing an amount of magnetic material which is less than that required to produce a signal of the first kind.

7. The invention as claimed in claim 6, in which:

the means responsive to raw signals includes a threshold detector including two differential comparators coupled to distinguish between said first signals and said second signals, where said first signals include extraneous noise and said second signals are substantially free of noise.

8. In a character recognition system for discriminating between areas of a document bearing magnetic material in sufficient quantity to form a character and areas of a document bearing less magnetic material, means comprising:

a threshold detector coupled to accept input signals from a magnetic read head, said detector providing first output signals representing excursions of a first group of said input signals beyond certain threshold levels corresponding to areas on a document in which a minimum concentration of magnetic material is found;

said detector providing second output signals representing excursions of a second group of said input signals within certain threshold levels corresponding to areas on a document in which the concentration of magnetic material is less than the minimum required to provide signals of the first group;

counter means coupled responsive to said first and said second group of input signals;

said counter means responding to input signals of the first group to reset repeatedly to zero and provide a fixed value at its output;

said counter means responding to input signals of the second group by continuing to count, unless disturbed by a first signal, to provide a logic ONE after a count which is two feature periods long where said count two feature periods long denotes the presence of an intercharacter space two feature periods wide.

9. In a character recognition system, means for determining whether magnetic material is present in a particular concentration in an area of a document scanned by a magnetic character read head, comprising:

means responsive to raw signals from a magnetic character read head for providing output signals, said output signals including first signals which are generated by passage of the read head past magnetic material which is present in a particular concentration and second signals denoting passage of the read head past areas where magnetic material is present in less than the particular concentration;

means coupled responsive to said first signals and said second signals to establish the presence or absence of magnetic material in the particular concentration for periods determined in accordance with said signals;

said means coupled to establish the presence or absence of magnetic material in the particular concentration including a counter;

said counter being reset by logic ZERO among said first and second signals, said counter responding to being reset by starting the count of clock pulses; and said counter providing a logic ONE output when a count of pulses representing two feature periods is reached.

* * * * *